United States Patent [19]
Aoki et al.

[11] Patent Number: 5,249,047
[45] Date of Patent: Sep. 28, 1993

[54] PREDICTIVE CODING SYSTEM

[75] Inventors: Akio Aoki, Tokyo; Kenichi Nagasawa, Kawasaki, both of Japan

[73] Assignee: Canon Kabushiki Kaisha, Tokyo, Japan

[21] Appl. No.: 970,539

[22] Filed: Nov. 2, 1992

Related U.S. Application Data

[63] Continuation of Ser. No. 666,609, Mar. 8, 1991, abandoned, which is a continuation of Ser. No. 258,710, Oct. 17, 1988, abandoned.

[30] Foreign Application Priority Data

Oct. 27, 1987 [JP] Japan .................. 62-272282
Oct. 31, 1987 [JP] Japan .................. 62-276346
Oct. 31, 1987 [JP] Japan .................. 62-276347

[51] Int. Cl.$^5$ ............... H04N 11/04; H04N 7/12; H04N 7/137
[52] U.S. Cl. .................... 358/135; 358/13; 358/133
[58] Field of Search ........... 358/13, 11, 12, 105, 358/133, 135, 138, 140; 375/27, 30; 370/58.1

[56] References Cited

U.S. PATENT DOCUMENTS

| | | | |
|---|---|---|---|
| 3,795,763 | 3/1974 | Golding et al. | 358/135 |
| 3,806,640 | 4/1974 | Furakawa | 360/23 |
| 4,458,271 | 7/1984 | Hostmann | 358/310 |
| 4,521,803 | 6/1985 | Gittemger | 358/12 |
| 4,607,281 | 8/1986 | Stark | 358/136 |
| 4,668,985 | 5/1987 | Kurashige | 358/134 |
| 5,103,294 | 4/1992 | Aoki et al. | 358/13 |

FOREIGN PATENT DOCUMENTS 58-147288 9/1983 Japan .................. 358/13
63-146677 6/1988 Japan .

OTHER PUBLICATIONS

Pirsch, "Design of a DPCM Codec for VLSI Realization in CMOS Technology", IEEE Proceedings, 73:4, pp. 592–598 (Apr. 1985).

Knauer, "Distributed VLSI Processors for Picture Coding", IEEE Proceedings, Int'l. Conf. on Comm., pp. 718–723 (May 1984).

*Primary Examiner*—James J. Groody
*Assistant Examiner*—Safet Metjahic
*Attorney, Agent, or Firm*—Fitzpatrick, Cella, Harper & Scinto

[57] ABSTRACT

A predictive coding system is disclosed wherein an input data sequence sequentially including a number of samples is subjected to time-base expansion by n times, where n is an integer not smaller than 2, using an interval of a predetermined period including a plurality of samples as a unit to form n-channel data sequences, and said n-channel data sequences are input in n predictive coding means in parallel.

12 Claims, 10 Drawing Sheets

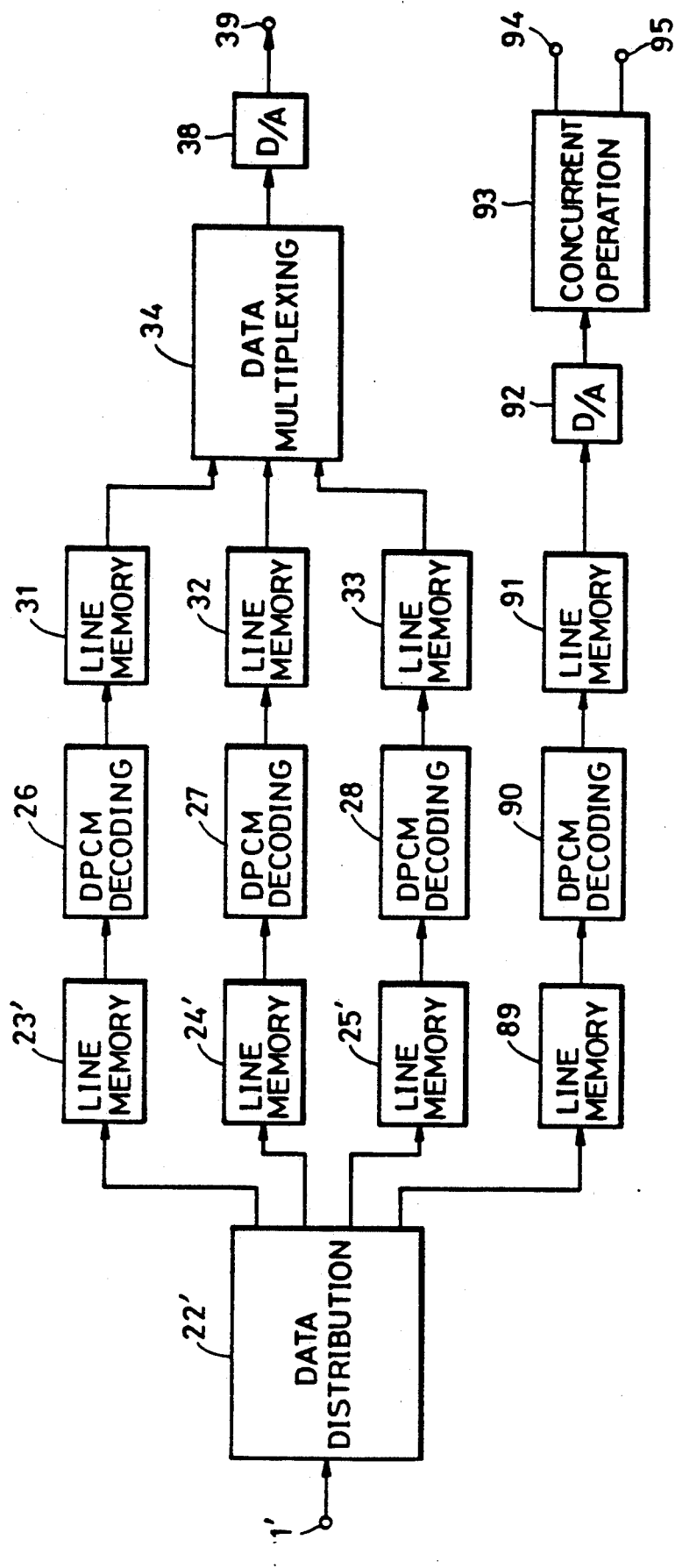

PREDICTIVE CODING SYSTEM

This application is a continuation of application Ser. No. 07/666,609 filed Mar. 8, 1991, now abandoned, which is a continuation of application Ser. No. 07/258,710 filed Oct. 17, 1988 now abandoned.

BACKGROUND OF THE INVENTION

1. Field of the Invention

This invention relates to a predictive coding system, and more particularly to a predictive coding system which handles data having a high transmission rate.

2. Description of the Prior Art

As means for coding when signals having temporal correlation such as video signals and audio signals are digitally transmitted, there is known predictive coding such as the well-known differential PCM coding (hereinafter termed DPCM). For example, when signals having a large amount of information such as television signals are transmitted, it is necessary to decrease bit rates down to transmission bit rates which conform to a transmission line. The use of predictive coding as means for that purpose.

Now, it is necessary to perform predictive coding processing at high speed when the transmission rate is extremely high, but there exists a limitation in realizing high-speed processing.

There is generally known, as means for realizing a high-speed digital data processing, means wherein each of the data of a data sequence is sequentially and cyclically supplied to a plurality of processing systems for each sample, and the processing speed of each system is decreased down to a fraction of plural numbers to increase the processing speed as a whole.

Accordingly, when this means is applied to predictive coding processing, high-speed processing can be realized.

However, when the above-described means is applied to the predictive coding processing of image data, for evaluating the predictive value of a picture element in each system, i.e., each coder, the data input immediately before, i.e., the data of an adjacent picture element, is not utilized. For example, when one-dimensional DPCM coding of video data transmitted in a raster is performed, a predictive value is produced with a picture element separated by a plurality of picture elements in the horizontal direction on a picture, so that the predictive error becomes large. This is because the correlation between a picture element used for producing the predictive value of the picture element in question, and the latter picture element, decreases.

In general, differential data are non-linearly quantized for the purpose of reducing the amount of data. When the value of predictive error is large, the difference between the typical value of non-linearly quantized data and the true value becomes large, resulting in deterioration of image data transmitted.

In the predictive coding of an image, it is possible to use the so-called two-dimensional predictive coding which uses the correlation in the vertical direction of an image, as well, to further reduce the predictive error. However, when parallel processing of data is performed by using a plurality of predictive coders, an image used for prediction can not be freely selected in the case of performing the aforementioned processing, so that it is impossible to reduce the predictive error.

Further, in the case of DPCM coding of color video signals, the sampling frequency of color signals is generally set lower than the sampling frequency of luminance signals because details of the color attract less of the viewer's attention. In this case, two DPCM-coding circuits and clock circuits for driving are required, one of each for luminance signals and one of each for color signals.

SUMMARY OF THE INVENTION

It is an object of the present invention to provide a novel predictive coding system which can solve the problems described above.

It is another object of the present invention to provide a predictive coding system which is capable of processing even a data sequence with a high transmission rate, and which at the same time does not produce deterioration in the information transmitted.

To achieve such an object, as an embodiment according to the present invention, there is provided a predictive coding system comprising (a) input means for inputting a data sequence sequentially including a number of samples, (b) distribution means for distributing the data sequence input by said input means by making a predetermined time interval including a plurality of samples as a unit to output n-channel data sequences, where n is an integer not smaller than 2, (c) n time-base expansion means for performing time-base expansion of the n-channel data sequences output from said distribution means, and (d) n predictive coding circuits in which the n-channel data sequences which have been time-base expanded by said n time-base expansion means are input, respectively.

It is another object of the present invention to provide a predictive coding system wherein high-speed coding processing of image data as well as very effective two-dimensional predictive coding can be performed.

To achieve that object, as another embodiment according to the present invention, there is provided a predictive coding system comprising (a) input means for inputting a data sequence indicating video signals, (b) distribution means for distributing the data sequence input by said input means by making a horizontal scanning line interval as a unit to output n-channel data sequences, where n is an integer not smaller than 2, (c) time-base expansion means for performing time-base expansion of the n-channel data sequences output from said distribution means, respectively, and (d) n predictive coding circuits in which the n-channel data sequences which have been time-base expanded by said n time-base expansion means are input, respectively, said n predictive coding circuits being constituted so as to give and receive data indicating local decoded values of each other, and performing predictive coding by utilizing data indicating local decoded values from other predictive coding circuits.

It is still another object of the present invention to provide a predictive coding system which can, on the occasion of predictive coding of a color image, decrease the processing speed within a coder without deteriorating the quality of the image, and which can at the same time realize a simplification and lower cost of the circuit configuration.

To achieve that object, as still another embodiment of the present invention, there is provided a predictive coding system comprising (a) input means for inputting data sequence indicating luminance signals and data sequence indicating color signals, respectively, (b) distribution means for distributing the data sequence indicating luminance signals input by said input means by making a horizontal scanning line interval as a unit to output n-channel data sequences, where n being an integer not smaller than 2, (c) time-base expansion means for performing time-base expansion of n-channel data sequences output from said distribution means, respectively, and (d) (n+1) predictive coding circuits in which the n-channel data sequences which have been time-base expanded by said n time-base expansion means, respectively, and the data sequence indicating color signals input by said input means are input, respectively.

The other objects and features of the present invention will become apparent from the following detailed description taken in connection with the accompanying drawings.

BRIEF DESCRIPTION OF THE DRAWINGS

FIGS. 6A, 6B and 6C illustrate diagrams for explaining about a coding unit of a system as another example of the present invention in which:

FIG. 6 (B) is a diagram illustrating a configurational example of the decoder in FIG. 6 (A); and FIG. 6 (C) is a diagram showing the disposition of picture elements for explaining the operation of the coder.

FIG. 7 is a diagram for explaining a decoding unit corresponding to the coding unit in FIGS. 6A, 6B and 6C in which:

FIG. 7 (A) is a diagram illustrating a schematic configuration thereof; and

FIG. 7 (B) is a diagram illustrating a configuration of a decoder corresponding to the coder in FIG. 6 (B).

FIG. 10 is a diagram illustrating a configuration of a decoding unit corresponding to the coding unit in FIG. 8.

DETAILED DESCRIPTION OF THE PREFERRED EMBODIMENTS

Now, an embodiment wherein the present invention is applied to a DPCM coding system of video signals will be explained.

Figure 1:
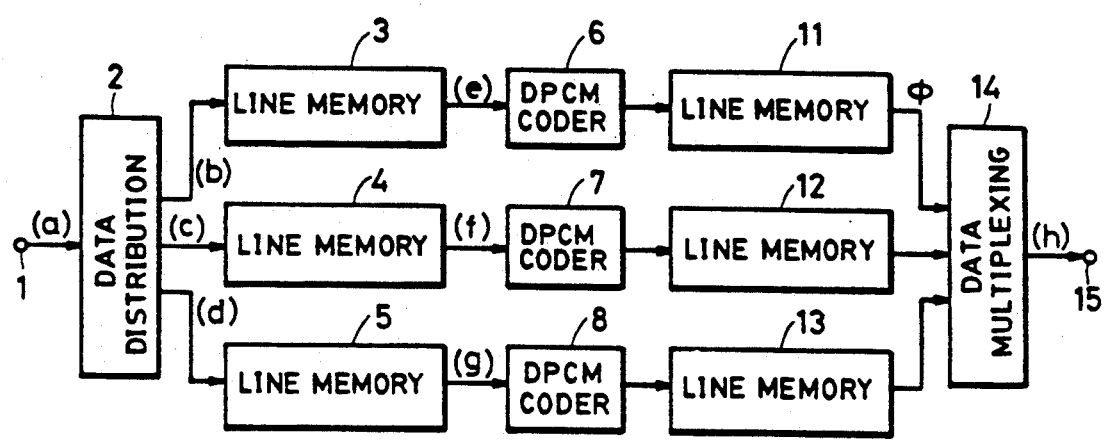
FIG. 1 is a diagram illustrating a configuration of a coding unit of a system as an embodiment of the present invention.
Figure 2:
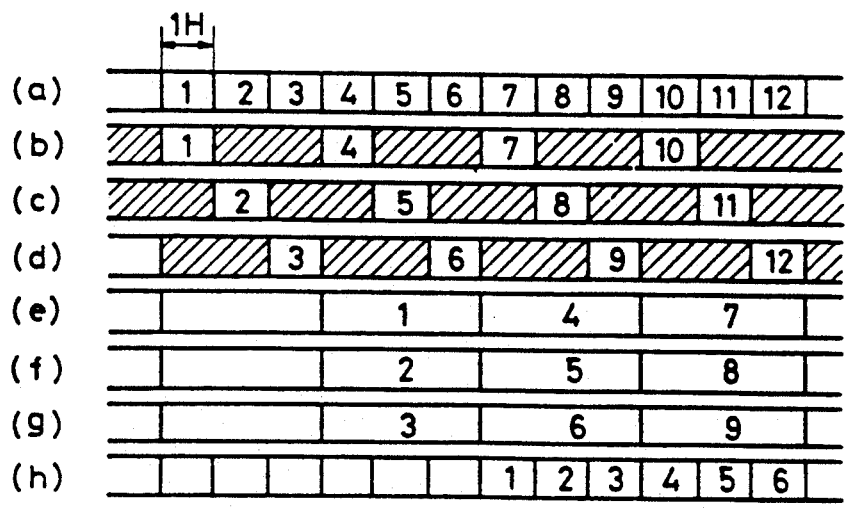
FIG. 2 is a timing chart for explaining the processing timing of each part in FIG. 1.

FIG. 1 is a diagram illustrating a configuration of a coding unit of a system as an embodiment of the present invention, and FIG. 2 is a timing chart for explaining the processing timing of each part in FIG. 1.

In FIG. 1, there is shown a terminal 1 in which a data sequence obtained by sampling television signals is input, and the data input is distributed to three channels by a data distributor 2. The data distributor 2 sequentially and cyclically supplies the data input to line memories 3, 4 and 5 for each 1 horizontal scanning line (H). FIG. 2 (a) graphically illustrates data being input to the distributor 2, where numerals show horizontal scanning line numbers. FIG. 2 (b), (c) and (d) show input data line memories 3, 4 and 5, respectively, oblique lines showing the absence of data input, and the numerals being horizontal scanning line numbers.

The line memories 3, 4 and 5 are for expanding the time bases of input data by three times and for outputting the resultant data, respectively, and take in data of 1H interval, and perform data read-out during a period of 3H interval of the input data. The data output timings of the line memories 3, 4 and 5 are, as shown in FIG. 2 (e), (f) and (g), set so that data of a 3H interval are simultaneously output in parallel. The transmission rate of data read from the line memories 3, 4 and 5 becomes $\frac{1}{3}$ of the transmission rate of data input, and these data are input to DPCM coders 6, 7 and 8 in parallel. The DPCM coders 6, 7 and 8 perform well-known processing, and supply differential data to line memories 11, 12 and 13 in parallel. Here, it is assumed that the processing times required for the coding of the DPCM coders 6, 7 and 8 are sufficiently short compared with the period of 1H. The line memories 11, 12 and 13 take in differential data, perform time compression to $\frac{1}{3}$ in a unit of 1H interval and output the resultant data. The read-out timings for these operations are set so that each memory 11, 12 and 13 sequentially outputs data of 1H interval for each 1H period of the input data.

The differential data read out from the line memories 11, 12 and 13 are subjected to time-base multiplexing in a data multiplexing circuit 14, are line-sequentially output with a timing shown in FIG. 2 (h) like the original input data, and are sent out to various transmission lines via a terminal 15.

In a predictive coding system as described above, the transmission rate of data input to each DPCM coder 6, 7 and 8 becomes $\frac{1}{3}$ of the input data, and on the whole DPCM coding can be performed with a speed three times the respective processing speed of the DPCM coders 6, 7 and 8. Further, data of the total picture elements with regard to each horizontal scanning line are sequentially input to each DPCM coder, so that a coding utilizing a correlation between adjacent picture elements can be performed, and thus the predictive error does not become large when a predictive value is produced.

Figure 3:
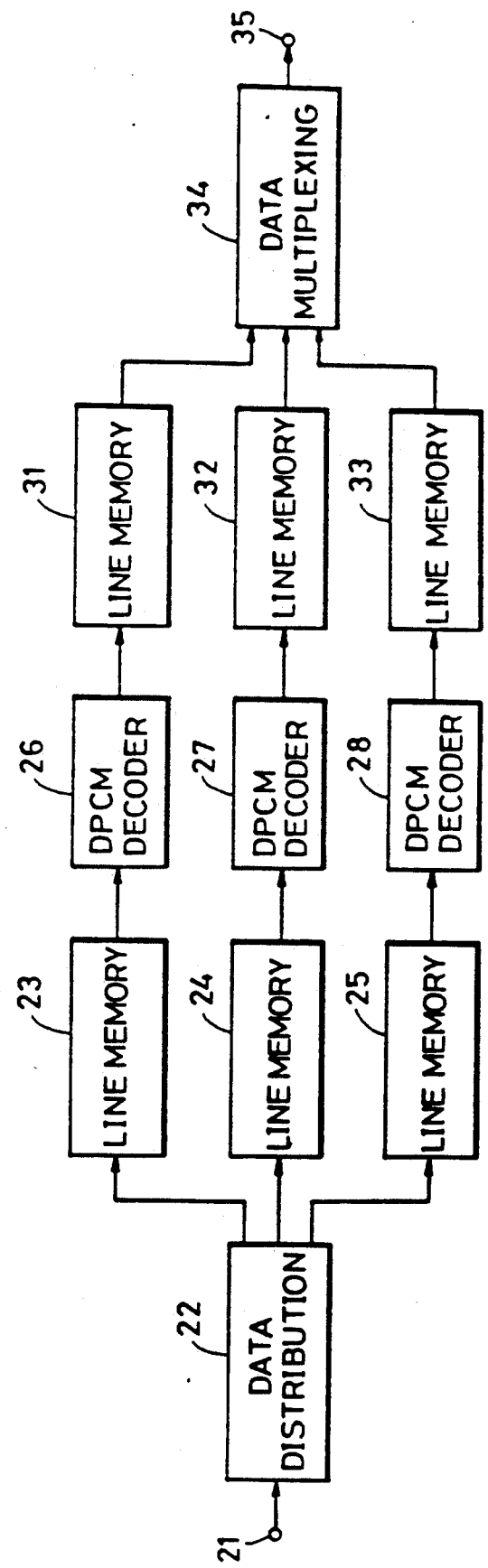
FIG. 3 is a diagram illustrating a configuration of a decoding unit corresponding to the coding unit in FIG. 1.

FIG. 3 is a diagram illustrating a configuration of a decoding unit corresponding to the coding unit in FIG. 1, wherein differential data are line-sequentially input to a terminal 21 via a transmission line. A data distributor 22 sequentially and cyclically supplies these differential data for every 1H interval thereof to line memories 23, 24 and 25. The line memories 23, 24 and 25 have a configuration to perform the time-base expansion of differential data of the 1H interval input during a period of a 1H interval of the input differential data in a 1H time interval unit to three times, respectively, and to output the resultant data. They output the data simultaneously like the line memories 3, 4 and 5. DPCM decoders 26, 27 and 28 receive the outputs from the line memories 23, 24 and 25, perform DPCM decoding, and supply the decoded data to line memories 31, 32 and 33. The line memories 31, 32 and 33 perform the time-base compression of decoded data of a 1H interval input during a period of 3H interval of the input differential data in a 1H interval unit to ⅓. The line memories 31, 32 and 33 sequentially output the decoded data of 1H interval to input in a data multiplexing circuit 34, and these data are line-sequentially multiplexed again to be output from a terminal 35.

It will be noted that even in the above-described decoding system, decoding can be performed with a speed three times the processing speed of each DPCM decoder.

Figure 4:
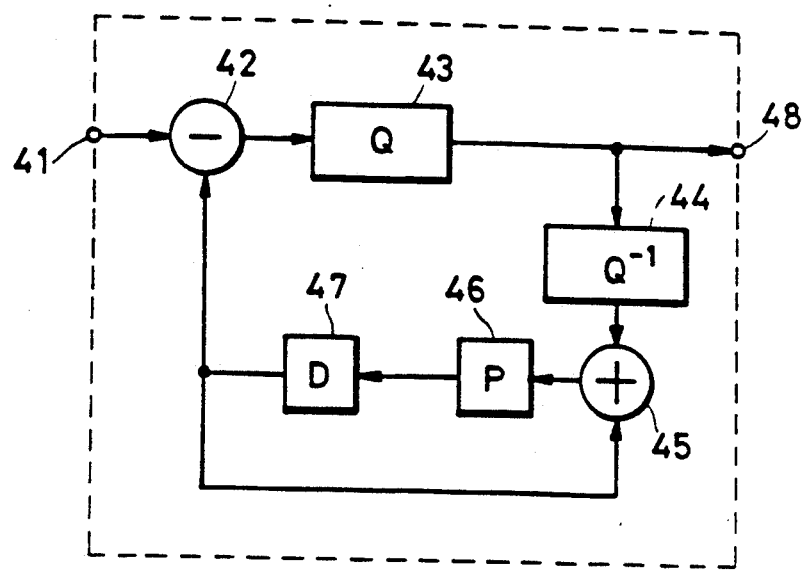
FIGS. 4 and 5 are diagrams illustrating concrete examples of the decoders in FIG. 1, respectively.
Figure 5:
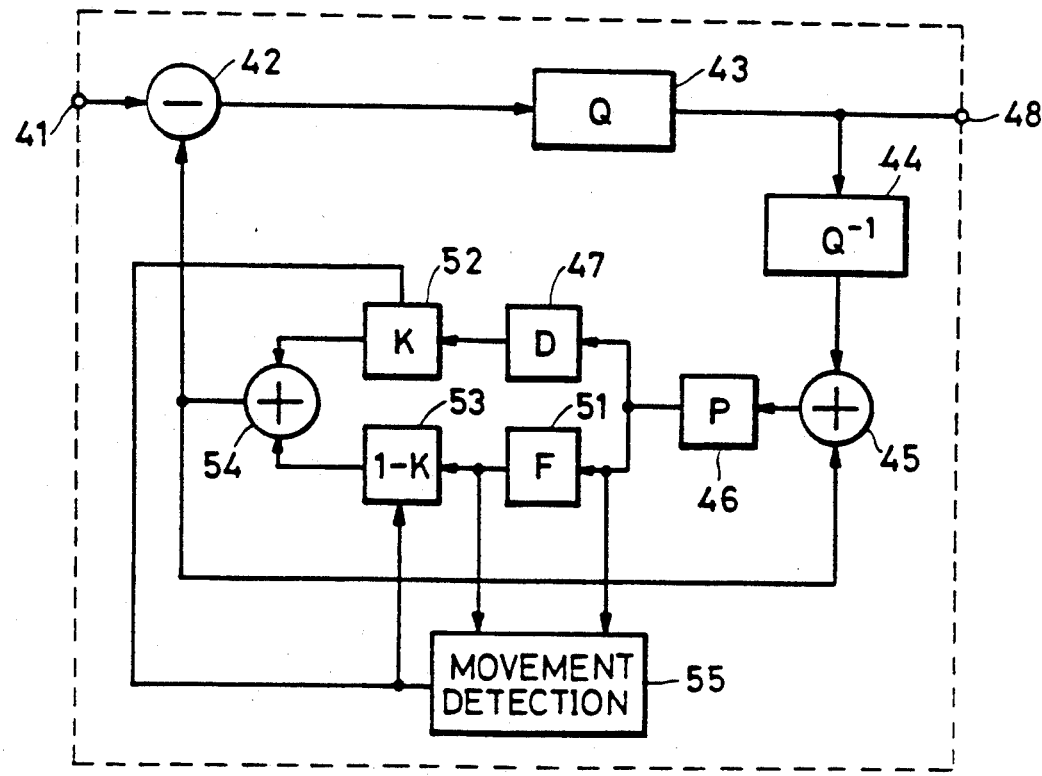

Now, an example of a configuration of a DPCM coder applicable to a system of an embodiment as described above will be explained. FIGS. 4 and 5 are diagrams illustrating a concrete example of the DPCM coders 6, 7 and 8 in FIG. 1, respectively.

In FIG. 4, there are shown a terminal 41 to which PCM data are to be input, an arithmetic unit 42 which outputs a differential value between a predictive value and an input value, a quantizer 43 which non-linearly quantizes the output of the arithmetic unit 42 with a quantizing characteristic Q to reduce the numbers of bits and data from the non-linear quantizer 43 are output from a terminal 48 as the output from this coder. A circuit 44 for setting the typical value for the output value of the quantizer 43 has a characteristic $Q^{-1}$ inverse to the quantizing characteristic Q, and an adder 45 adds the aforementioned typical value and the predictive value of the preceding picture element to obtain the local decoded value. The output of a coefficient multiplier 46 which multiplies the predictive coefficient P, is delayed by a period of one picture element interval by a delay circuit 47 to be used as a new predictive value, and is supplied to the arithmetic unit 42 and the adder 45. This adder itself is well known, so that detailed explanation of the operation thereof will be omitted.

The adder in FIG. 4 produces the predictive value by using only an adjacent picture element in the same horizontal scanning line as the picture element in question. However, the system according to the present invention is not only applicable to such a system using a coder which performs the so-called preceding value prediction, but also is applicable to a system using a coder which uses even the correlation of an image in the temporal direction: one example of this kind of coder is shown in FIG. 5.

In FIG. 5, like components to those in FIG. 4 are indicated by like numerals, and explanation thereof will be omitted. The local decoded value obtained by the adder 45 is multiplied with the predictive coefficient in the coefficient multiplier 46, and then is input to the delay circuit 47 for one picture element interval and to a delay circuit 51 for one frame interval. The outputs of these delay circuits 47 and 51 are multiplied with the coefficients in coefficient multipliers 52 and 53, and then are added in an adder 54 to obtain the predictive value.

Coefficients (k) and (1−k) of the coefficient multipliers 52 and 53 are determined in a movement detection circuit 55 which detects the amount of the correlation of the image in the temporal direction. That is, the larger the correlation in the temporal direction, the smaller becomes the value of k. Several configurations can be considered for the movement detection circuit 55, and there have been various proposals therefor, but explanation on the concrete configuration thereof will be omitted because they have no direct relationship with the present invention.

It will be noted that while in the above-described embodiment video signals have been presumed as data to be handled, it is not limited thereto and the present invention can be applied even to the case in which other information signals are handled. In the case of video signals, a unit for time-base conversion has been taken as a 1H interval, taking in consideration the fact that an initializing timing of the DPCM coder, i.e., a timing which sends data not differentiated will exist at least with a timing of the start of each horizontal scanning line. Similarly, in the case of other information signals the initializing cycle may be made as a unit for time-base conversion.

It will be also noted that while in the above-described embodiment three-channel parallel processing is performed, it is possible in general to perform n (≧2)-channel parallel processing. It is needless to say that in this case a time-base expansion circuit for expanding n times is provided in the front stage of n coders, and a time-base compression circuit for compressing to 1/n is provided in the rear stage.

Figure 6:
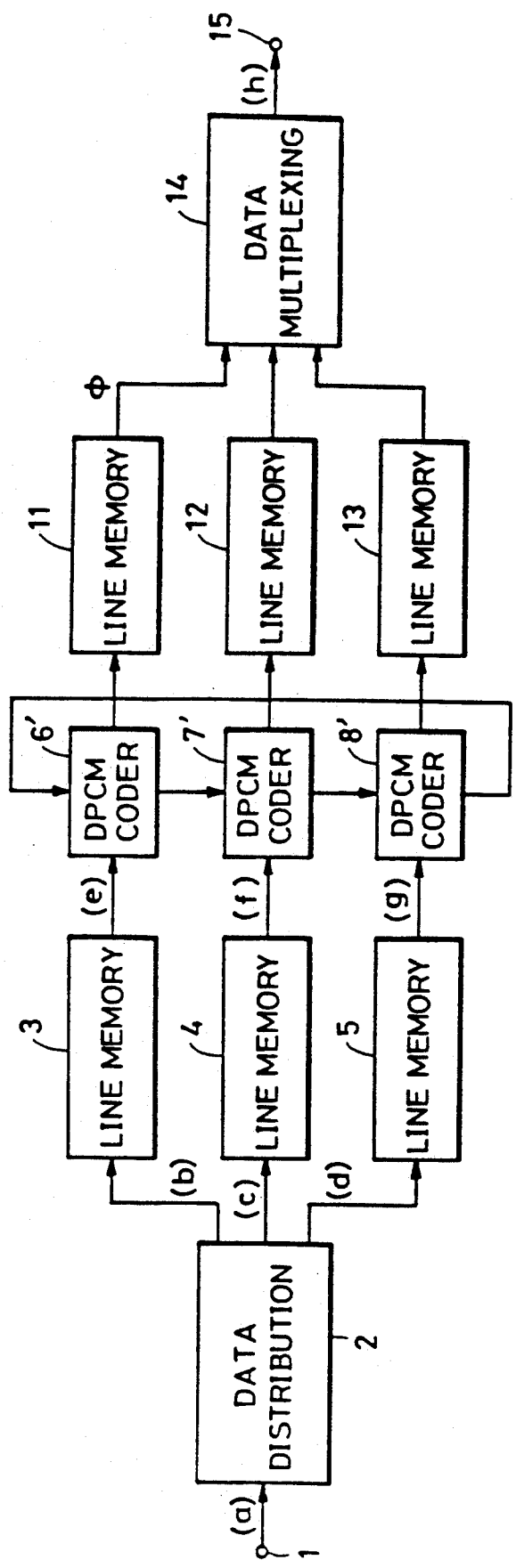
FIG. 6 (A) is a diagram illustrating a schematic configuration thereof.
Figure 6:
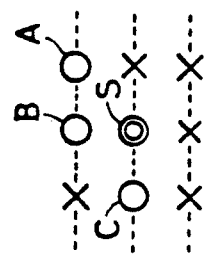
Figure 6B:
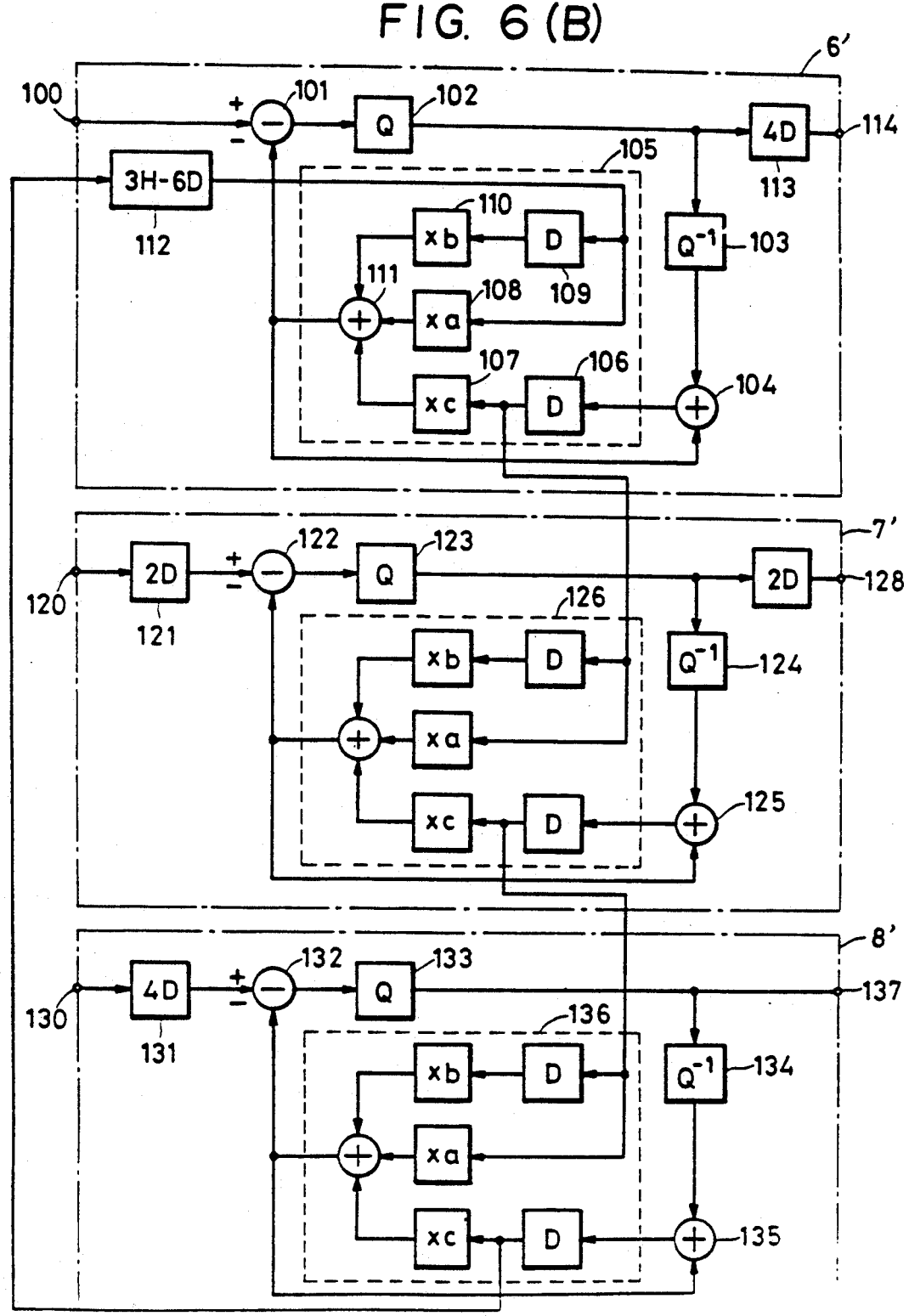

Next, an embodiment when the present invention is applied to a two-dimensional DPCM coding system of video signals will be explained. FIGS. 6 (A), (B) and (C) are diagrams for explaining a system of an embodiment of the present invention.

FIG. 6 (A) is a diagram illustrating a schematic configuration of a coding unit of a system as the present embodiment, in which like components as in FIG. 1 are indicated by like numerals, and detailed explanation thereof will be omitted. DPCM coders 6', 7' and 8' perform two-dimensional prediction by using data from other coders 8', 6' and 7', and supply differential data to line memories 11, 12 and 13 in parallel.

FIG. 6 (B) is a diagram illustrating concrete configurations of the two-dimensional DPCM coders 6', 7' and 8' in FIG. 6 (A), and FIG. 6 (C) is a diagram for explaining the method for operating of predictive values by the coders in FIG. 6 (B).

First, a circuit within the two-dimensional DPCM coder 6' will be explained. There is shown a terminal 100 in which data read out from the line memory 3 are input. An arithmetic unit 101 is for operating the differential value between the predictive value and the input value, and a quantizer 102 non-linearly quantizes the output of the arithmetic unit 101 with a quantizing characteristic Q to reduce the number of bits, and data which the non-linear quantizer 102 outputs are supplied to a delay circuit 113 and to a circuit 103. The circuit 103 for setting the typical value for the output value of the quantizer 102 has a characteristic $Q^{-1}$ inverse to the quantizing characteristic Q, and an adder 104 is for adding the aforementioned typical value and the predictive value of the preceding picture element to obtain the local decoded value. The output of a predictive unit 105 is supplied to the arithmetic unit 101 and the adder 104 as the predictive value.

The above-described components 101–105 in the coder 6' are the same as the components 122–126 and 132–136 in the coders 7' and 8', respectively, and the configuration is the same as for predictive units 105, 126 and 136 of each coder 6, 7 and 8. Here, explanation will be made by taking the predictive unit 105 as an example.

A delay unit 106 delays the local decoded value obtained from the adder 104 by a period of 1 picture element interval (D). When the picture element evaluating the predictive value is assumed to be a picture element shown as S in FIG. 6 (C), the output of said delay unit 106 is the local decoded value of the picture element right before that, i.e., the adjacent picture element in the horizontal direction (shown as C in FIG. 6 (C)). A delay unit 112 is for delaying the local decoded value output from an adder 135 of the coder 8 by a period shorter than 3 horizontal scanning periods by an amount equal to the interval of 6 picture elements (3H-6D). Here, 3 horizontal scanning period means 3 horizontal scanning period of the input signals to the terminal 1 in FIG. 1 (A), which corresponds to a period wherein the image data of 1H interval are input to the coders 6, 7 and 8, respectively. In the coder 8 there is provided a delay unit for a period of 4 times the interval of a picture element interval in the input side. As is clear by referring to FIG. 2, the local decoded value of the picture element (shown as A in FIG. 6 (C)) which has shifted by one picture element in the horizontal direction in the line right before the picture element S is to be output from the delay unit 112. The output of a delay unit 109 for 1D is the local decoded value of the picture element (shown as B in FIG. 6 (C)) in the preceding line at the same location in the horizontal direction.

The coefficients a, b and c of the local decoded values of the picture elements A, B and C are multiplied by coefficient multipliers 108, 110 and 107, added by an adder 111 to obtain the predictive value of the picture element S. That is, in order to operate the predictive value of the picture element S in FIG. 6 (C), the local decoded values of 3 picture elements shown by ○ in the figure are used.

Data input are delayed by 1D by a delay unit 121 in the coder 7, so that if it is assumed that the predictive value obtained from the predictive unit 126 evaluates the predictive value with regard to the picture element S in FIG. 6 (C), the local decoded value output from the coder 6 to the coder 7 becomes the one with regard to the picture element A. Similarly, data input are delayed by 2D by a delay unit 131 in the coder 8, so that if it is assumed that the predictive value obtained from the predictive unit 136 is with regard to the picture element S in FIG. 1 (C), the local decoded value output from the coder 7 to the coder 8 becomes the one with regard to the picture element A.

By thus shifting picture elements to be processed in the coders 6, 7 and 8 in the horizontal direction, i.e., by shifting the processing timing of picture elements aligning in the vertical direction of a picture by the coders 6, 7 and 8 by the existence of the delay units 121 and 131, the picture elements located at the both sides in the horizontal direction with regard to the picture element for which the predictive value is to be operated can be utilized for the operation. Accordingly, a prediction with less value of predictive error can be performed. It will be noted that delay units 113 and 127 have delay periods of 4D and 2D, respectively, and are provided so that the outputs of the coders 6, 7 and 8 have the same timing with regard to picture elements aligning in the vertical direction.

In a coding system as described above, the transmission rates of data input in each DPCM coder 6, 7 and 8 become ⅓ of that of the input data, and on the whole DPCM coding can be performed with a speed three times the processing speed of each of the DPCM coders 6, 7 and 8. Since data of total picture elements with regard to each horizontal scanning line are sequentially input in each DPCM coder, a coding utilizing a correlation between adjacent picture elements can be performed, and thus predictive error does not become large when a predictive value is produced. Further, in the line right before, picture elements located in front and in rear in the horizontal direction can be utilized, so that a two-dimensional prediction with a high predictive accuracy becomes possible.

Figure 7:
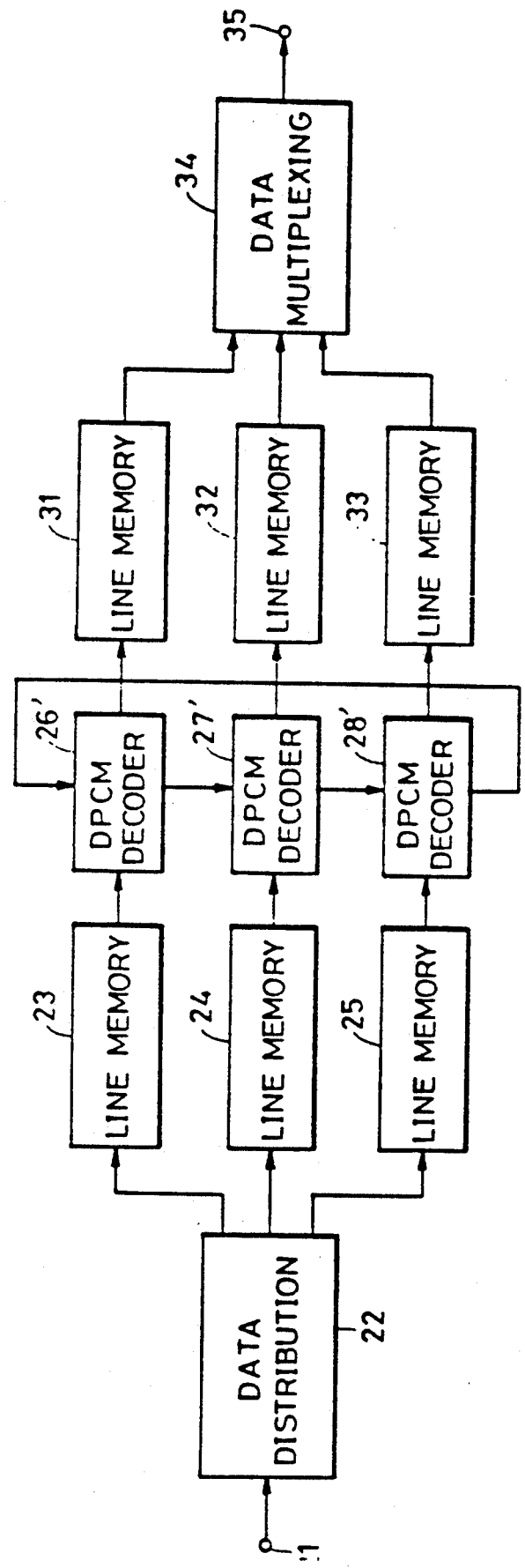
Figure 7:
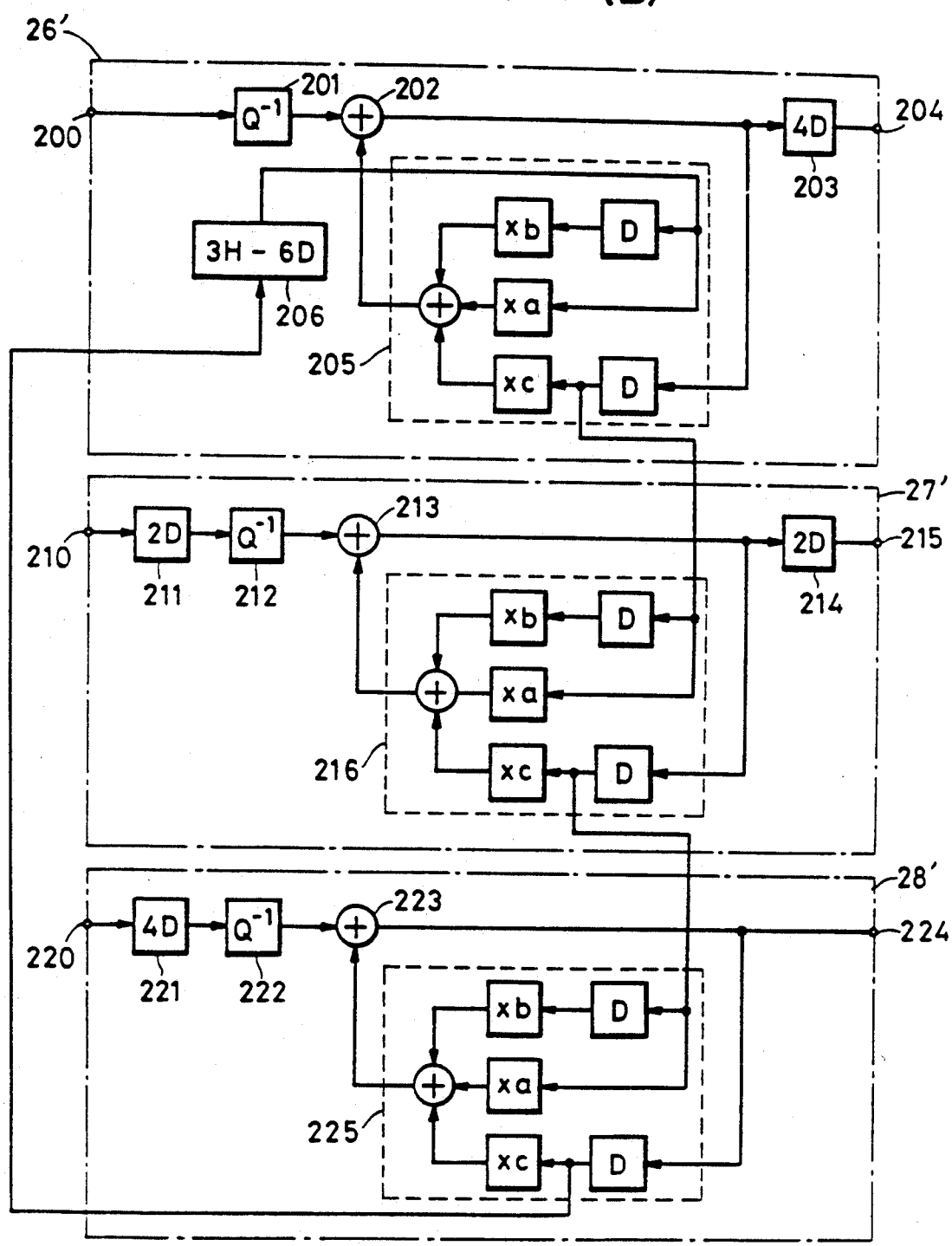

FIG. 7 (A) is a diagram illustrating a schematic configuration of a decoding unit corresponding to the coding unit in FIG. 6. In the figure like components as in FIG. 3 are indicated by like numerals, and explanation thereof will be omitted. DPCM decoders 26', 27' and 28' receive the outputs of the line memories 23, 24 and 25 and decoded values of other decoders to perform DPCM decoding, and supply the decoded data to line memories 31, 32 and 33.

FIG. 7 (B) is a diagram illustrating concrete configurational examples of the decoders 26', 27' and 28' which correspond to the decoders 6', 7' and 8' illustrated in FIG. 6 (B). There are shown delay units 211 and 221 for 2D and 4D for shifting the decoding timings of picture elements aligning in the vertical direction of a picture, typical value-setting circuits 201, 212 and 213 the same as 103, respectively, adders 202, 213 and 223 for outputting decoded values, arithmetic units 205, 216 and 225 for performing the same operations as the predictive unit 105, a delay unit 206 for supplying decoded values of scanning lines decoding-processed in the decoder 28 during a period right before (3H-6D), and delay units 203 and 214 for 4D and 2D for making coincide the output timings of the decoded values of picture elements aligning in the vertical direction of a picture. The operation of each decoder 26, 27 and 28 is the same as the above-described operation after the arithmetic units 101, 122 and 132 in the coders 6, 7 and 8, hence explanation thereof will be omitted.

It goes without saying that even in the above-described decoding system, decoding can be performed with a speed three times the processing speed of each DPCM decoder.

In the above-described embodiment, the processing time T of data from the outputs of the predictive units 105, 126 and 136 to the inputs have been neglected, but it can not be neglected when it is intended to realize, higher processing speed of. If this time T is taken into consideration, the delay time of the delay unit 106 should be made as (D−T). That is, it is necessary to precede the processing timing of the coder which generates the local decoded value used in the operation of the predictive value to the processing timing of the coder which operates this predictive value by T.

It will be noted that the configuration of a two-dimensional predictive unit is not limited to the configuration of the above-described embodiment. However, it is necessary to design by taking into consideration the existence of the aforementioned period T.

Next, further another embodiment wherein the present invention is applied to a DPCM coding system of color video signals will be explained.

Figure 8:
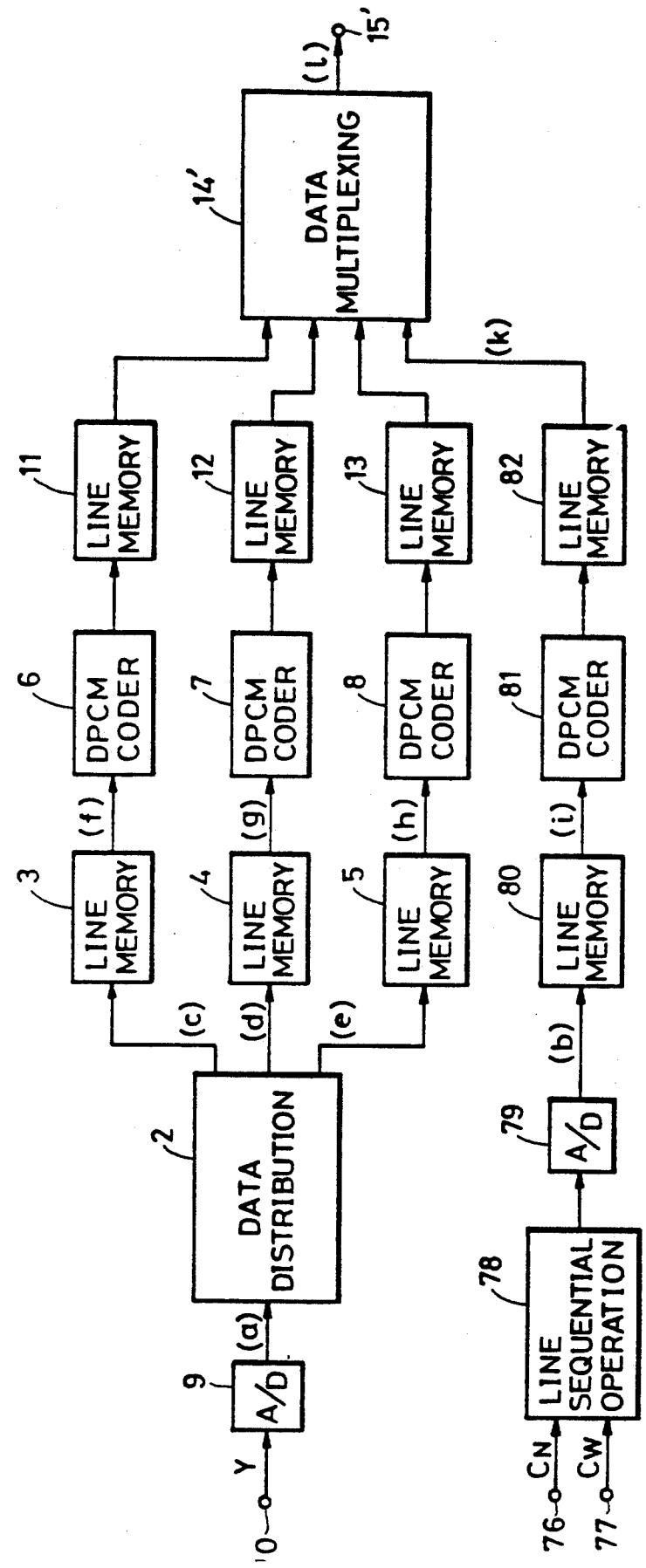
FIG. 8 is a diagram illustrating a configuration of a coding unit of a system as another embodiment of the present invention.
Figure 9:
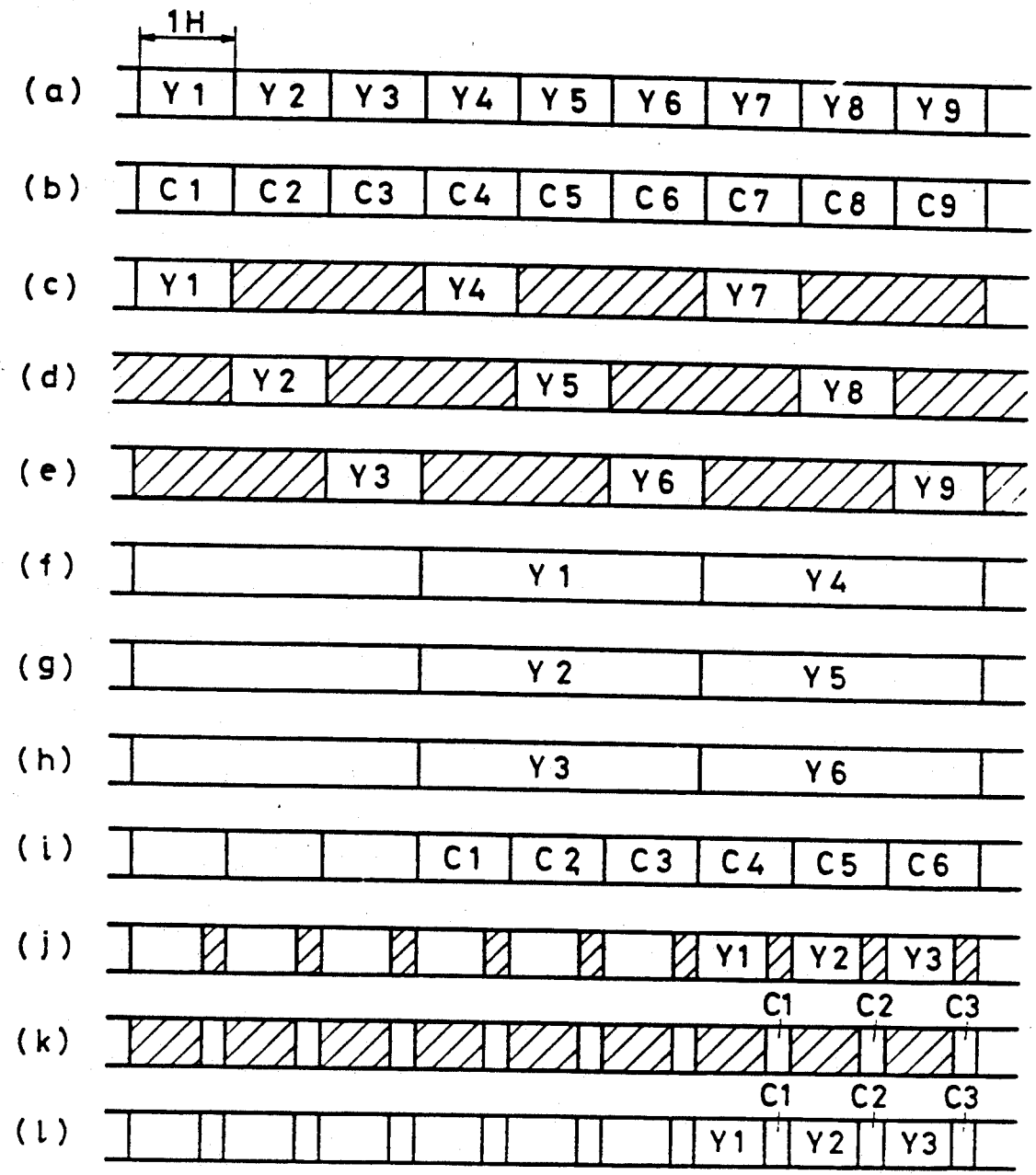
FIG. 9 is a timing chart for explaining the processing timing of each part in FIG. 8.

FIG. 8 is a diagram illustrating a configuration of a coding unit of a system as another embodiment of the present invention, and FIG. 9 is a timing chart for explaining the processing timing of each unit in FIG. 8. In FIG. 8, there are shown a terminal 10 in which luminance signals are to be input, and an analog-digital (A/D) converter 9 which performs sampling of the luminance signals input with a predetermined frequency $F_s$ to make digital data of several bits. The data sequence which the A/D converter 9 outputs is supplied to the data distributor 2, and to the DPCM coders 6, 7 and 8 via the line memories 3, 4 and 5 to be coded like in FIG. 1, and is supplied to line memories 11', 12' and 13'. FIG. 9(a) graphically illustrates data being input in the distributor 2, where Y indicates the luminous signal and numerals indicate horizontal scanning line numbers. FIG. 9 (c), (d) and (e) indicate input data in the line memories 3, 4 and 5, respectively, and oblique lines indicate the absence of data input. The data output timings of the line memories 3, 4 and 5 are, as shown in FIG. 9 (f), (g) and (h), set so that data for 3H interval are simultaneously output in parallel.

On the other hand, two kinds of color-difference signals $C_N$ and $C_W$ have been input in terminals 76 and 77 synchronous with luminance signals input to a terminal 10, and are input to a line-sequential operation circuit 78. The line-sequential operation circuit 78 alternately outputs $C_N$ and $C_W$ for every 1H period by well-known means, and an A/D converter 79 samples these line-sequential color-difference signals with a sampling frequency of $F_s/3$, and outputs as digital data having the same quantizing bit numbers as luminance signal data which the A/D converter 9 outputs.

This output timing of the A/D converter 79 is graphically illustrated in FIG. 9 (b). In the figure, C indicates color signals. Accordingly, when C1 is $C_N$, then C3, C5 and C7 are also $C_N$, and C2, C4, C6 and C8 are $C_W$. A line memory 80 delays the output of the A/D converter 79 by a period of 3H, and outputs with a timing shown in FIG. 9 (i). Here, the capacity of the line memory 80 is the same as the capacity of the line memories 3, 4 and 5, but the line memory 80 can delay by a period of 3H since the sampling number per unit time of the line-sequential color signals is ⅓ of the sampling number of the luminance signals. At this moment, the data which the line memory 80 outputs totally equal data which the line memories 3, 4 and 5 output in the quantizing bit numbers, the output timing and the sampling number per unit time. Accordingly, a DPCM coder 81 in which the output data of the line memory 80 are to be input is capable of having totally the same configuration as the DPCM coders 6, 7 and 8, and at the same time common clocks can be used for the driving thereof.

The output data of the DPCM coder 81 are supplied to a line memory 82 with a timing illustrated in FIG. 9 (i), and the line memory 82 takes in a portion of a 3H interval thereof, performs time-base compression, and outputs with a timing illustrated in FIG. 9 (k). That is, it outputs by 1H interval at a time during the last ¼H period of each 1H period. On the other hand, the line memories 11', 12' and 13' output by 1H interval during the first ¾ period of each 1H period (shown in FIG. 9 (j)), a data multiplexing circuit 14' performs multiplexing of these output data of the line memories 11', 12', 13' and 82, and sends out from a terminal 15' to various transmission lines with a timing illustrated in FIG. 9 (l).

In a coding system as described above, the DPCM coders 6, 7, 8 and 81 can have the totally same configuration, so that it is not necessary to prepare separate coders for luminance signals and for color signals, and thus it is possible to realize circuits with a lower cost. At the same time, the circuit configuration can be simplified because each DPCM coder 6, 7, 8 and 81 can be operated with a common clock.

FIG. 10 is a diagram illustrating a configuration of a decoding unit corresponding to the coding unit in FIG. 8, wherein data sent out from the coder in FIG. 8 are input in a terminal 21' via a transmission line. A data distributor 22' supplies these data to line memories 23', 24', 25' and 89 for every 1H interval with time sharing. The line memories 23', 24' and 25' have a configuration wherein differential data of a 1H interval input during a period of ¾H interval of the input differential data are performed time-base expansion thereof in a 1H interval unit, respectively, and the resultant data are output in a period of a 3H interval, and the line memories 3, 4 and 5 are arranged to simultaneously output the same data in the same way. The DPCM decoders 26, 27 and 28 receive the outputs of the line memories 23, 24 and 25, perform DPCM decoding of luminance signals, and supply the decoded data to line memories 31, 32 and 33. The line memories 31, 32 and 33 perform time-base compression to ⅓ the decoded data of a 1H interval input during a period of a 3H interval of the input differential data in a 1H interval unit, respectively. The line memories 31, 32 and 33 sequentially output the decoded data of a 1H interval to input in a data multiplexing circuit 34, and these data are line-sequentially multiplexed again, are input in a D/A converter 38 to be made as analog data, and are output from a terminal 39 as luminance signals.

On the other hand, from the data distributor 22' differential data with regard to line-sequential color signals are output by a 1H interval for every 1H period during a period of a ¼H interval, and the line memory 89 performs time-base expansion of these data to 4 times in a 1H interval unit and inputs to a DPCM decoder 90. The data decoded by the DPCM decoder 90 are delayed by a period of 3H by a line memory 91, and then are supplied to a D/A converter 92 to be restored to analog line-sequential color-difference signals. The line-sequential color-difference signals output form the D/A converter 92 are subjected to the concurrent operation of a well-known concurrent operation circuit 93 by performing line interpolation in the vertical direction of a picture with regard to $C_N$ and $C_W$, and are output from terminals 94 and 95 as two kinds of color difference signals.

Even in the above-described decoding system, luminance signals can be processed with a speed three times the processing speed of each DPCM decoder, and at the same time each decoder 26, 27, 28 and 90 can have totally the same configuration. Further, these decoders can be operated with the same clock.

It will be noted that in the above-described embodiment, an example wherein luminance signals and line-sequential color difference signals are handled, and the ratio of the sampling frequencies thereof is 3:1 has been explained, but it is possible to adopt a configuration wherein luminance signals and two kinds of color signals are sampled separately. It is also possible in general to make the ratio of the sampling frequencies n ($\geq 2$):1. For example, when data wherein luminance signals and two kinds of color difference signals are sampled with sampling frequencies having a ratio of 4:1:1 are handled, it can be realized by performing 4-channel parallel processing with regard to luminance signal data, and by preparing six identical predictive coding circuits in total including coding circuits for two kinds of color difference signals.

It will be also noted that in all the embodiments in the present description, the outputs of coders operating in parallel are multiplexed after performing time-base compression thereof, respectively, but when it is applied to a system wherein the subsequent processings are all performed in plural systems in parallel, and are transmitted in parallel, the aforementioned processings are unnecessary.

What is claimed is:

1. A predictive coding system comprising:

(a) input means for inputting a video data sequence sequentially including a number of pixels:

(b) distribution means for distributing the pixels of the video data sequence input by said input means using a predetermined time interval including a plurality of pixels as a unit for outputting n-channel data sequences, where n is an integer not smaller than 2, said predetermined time interval being an integer times a horizontal scanning period of the video data sequence;

(c) time-base expansion means for performing time-base expansion of the n-channel data sequences output from said distribution means, and for controlling timings of the n-channel data sequences such that n-pixels aligned in a vertical direction on a picture are output at the same time; and (d) predictive coding circuits into which the n-channel data sequences, output from said time-base expansion means, are input, respectively.

2. A predictive coding system according to claim 1 further comprising:

time-base compression means for performing time-base compression of n-channel data sequences consisting of codes which said predictive coding circuits output, respectively; and time-base multiplexing means for performing time-base multiplexing of n-channel data sequences which said time-base compression means output.

3. A predictive coding system according to claim 1 wherein said predictive coding circuits include differential PCM coders, respectively.

4. A predictive coding system according to claim 1 wherein said predictive coding circuits perform coding by utilizing the correlation of an image in the horizontal direction.

5. A predictive coding system according to claim 4 wherein said predictive coding circuits perform coding by further utilizing the correlation of the image in the vertical direction.

6. A predictive coding system according to claim 4 wherein said predictive coding circuits perform coding by further utilizing the correlation between images.

7. A predictive coding system according to claim 1 wherein said input means includes means for inputting an analog video signal and means for digitizing said analog video signal to output said video data sequence.

8. A predictive decoding system comprising:

(a) input means for inputting a video code sequence sequentially including predictive-coded codes;

(b) distribution means for distributing the codes for the video code sequence input by said input means using a predetermined time interval including a plurality of codes as a unit for outputting n-channel data sequences, where n is an integer not smaller than 2, said predetermined time interval being an integer times a horizontal scanning period of the video code sequence;

(c) time-base expansion means for performing time-base expansion of the n-channel data sequences output from said distribution means, and for controlling timings of the n-channel data sequences such that n-codes corresponding to n-pixels aligned in a vertical direction on a picture are output at the same time; and (d) n predictive decoding circuits into which the n-channel data sequences, output from said time-base expansion means, are input, respectively.

9. A predictive decoding system according to claim 8 further comprising:

time-base compression means for performing time-base compression of n-channel data sequences consisting of video data of decoded values which said n predictive decoding circuits output, respectively; and time-base multiplexing means for performing time-base multiplexing of n-channel data sequences which said time-base compression means output.

10. A predictive decoding system according to claim 8 wherein said n predictive decoding circuits include differential PCM decoders, respectively.

11. A predictive coding system comprising:

(a) input means for inputting a video data sequence sequentially including a number of pixels;

(b) distribution means for distributing the pixels of the video data sequence input by said input means using a predetermined time interval including a plurality of pixels as a unit for outputting n-channel data sequences, where n is an integer not smaller than 2, said predetermined time interval being a horizontal scanning period of the video data sequence;

(c) time-base expansion means for performing time-base expansion of the n-channel data sequences output from said distribution means, and for controlling timings of the n-channel data sequences such that all of n-pixels aligned in a vertical direction on a picture are output within a period less than (1/n) horizontal scanning periods; and (d) predictive coding circuits into which the n-channel data sequences, output from said time-base expansion means, are input, respectively.

12. A predictive decoding system comprising:

(a) input means for inputting a video code sequence sequentially including predictive-coded codes;

(b) distribution means for distributing the codes of the video code sequence input by said input means using a predetermined time interval including a plurality of codes as a unit for outputting n-channel data sequences, where n is an integer not smaller than 2, said predetermined time interval being a horizontal scanning period of the video code sequence;

(c) time-base expansion means for performing time-base expansion of the n-channel data sequences output from said distribution means, and for controlling timings of the n-channel data sequences such that all of n-codes corresponding to n-pixels aligned in a vertical direction on a picture are output within a period less than (1/n) horizontal scanning periods;

(d) n predictive decoding circuits into which the n-channel data sequences, output from said time-base expansion means, are input, respectively.

* * * * *

UNITED STATES PATENT AND TRADEMARK OFFICE
CERTIFICATE OF CORRECTION

PATENT NO. : 5,249,047
DATED : September 28, 1993
INVENTOR(S) : AKIO AOKI, ET AL.

Page 1 of 2

It is certified that error appears in the above-identified patent and that said Letters Patent is hereby corrected as shown below:

COLUMN 1

Line 23, "coding" should read --coding can be considered--.
Line 55, "of" should read --of a--.

COLUMN 5

Line 2, "of" should read --of the--.
Line 3, "input in" should be deleted.
Line 20, "numbers" should read --number--.
Line 21, "bits" should read --bits,--.

COLUMN 7

Line 6, "period" should read --periods--.

COLUMN 8

Line 39, "realize," should read --realize--.
Line 40, "speed of." should read --speed.--.

COLUMN 9

Line 7, "for" should read --for a--.

COLUMN 10

Line 30, "form" should read --from--.

UNITED STATES PATENT AND TRADEMARK OFFICE
CERTIFICATE OF CORRECTION

PATENT NO. : 5,249,047

DATED : September 28, 1993

INVENTOR(S) : AKIO AOKI, ET AL.

Page 2 of 2

It is certified that error appears in the above-identified patent and that said Letters Patent is hereby corrected as shown below:

COLUMN 11

Line 2, "pixels:" should read --pixels;--.

Signed and Sealed this

Thirty-first Day of May, 1994

Attest:

BRUCE LEHMAN

Attesting Officer

Commissioner of Patents and Trademarks